(12) United States Patent
Seydoux et al.

(10) Patent No.: US 8,922,215 B2
(45) Date of Patent: Dec. 30, 2014

(54) MEASUREMENT OF FORMATION PARAMETERS USING ROTATING DIRECTIONAL EM ANTENNA

(75) Inventors: Jean Seydoux, Houston, TX (US); Reza Taherian, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 407 days.

(21) Appl. No.: 13/468,274

(22) Filed: May 10, 2012

(65) Prior Publication Data

US 2012/0217968 A1    Aug. 30, 2012

Related U.S. Application Data

(62) Division of application No. 12/136,858, filed on Jun. 11, 2008, now Pat. No. 8,193,813.

(51) Int. Cl.
*G01V 3/08* (2006.01)
*G01V 3/30* (2006.01)
*E21B 7/04* (2006.01)
*E21B 47/02* (2006.01)

(52) U.S. Cl.
CPC ........................................ *G01V 3/30* (2013.01)
USPC .............................. 324/338; 175/45; 324/339

(58) Field of Classification Search
USPC ..................................... 324/338–339; 175/45
See application file for complete search history.

(56) References Cited

U.S. PATENT DOCUMENTS

| | | | |
|---|---|---|---|
| 4,285,236 | A | 8/1981 | Chien |
| 5,508,616 | A | 4/1996 | Sato et al. |
| 6,163,155 | A | 12/2000 | Bitter |
| 6,181,138 | B1 | 1/2001 | Hagiwara et al. |
| 6,297,639 | B1 | 10/2001 | Clark et al. |
| 6,304,086 | B1 | 10/2001 | Minerbo et al. |
| 6,476,609 | B1 | 11/2002 | Bittar |
| 6,509,738 | B1 | 1/2003 | Minerbo et al. |
| 6,541,979 | B2 | 4/2003 | Omeragic |
| 6,556,015 | B1 | 4/2003 | Omeragic et al. |
| 6,739,409 | B2 | 5/2004 | Kruspe et al. |
| 6,794,875 | B2 | 9/2004 | Strickland |
| 6,911,824 | B2 | 6/2005 | Bittar |
| 6,969,994 | B2 | 11/2005 | Minerbo et al. |
| 7,019,528 | B2 | 3/2006 | Bittar |
| 2006/0062082 | A1 | 3/2006 | Mandal |

FOREIGN PATENT DOCUMENTS

GB 2425357 A 10/2006
JP 63000525 A 1/1988

*Primary Examiner* — Bot Ledynh
(74) *Attorney, Agent, or Firm* — Kimberly Ballew

(57) ABSTRACT

A logging tool and method to make subsurface measurements is disclosed, wherein the tool is placed within a borehole penetrating a formation. The tool has a transmitter antenna and a receiver antenna spaced apart along a longitudinal axis of the tool, and at least one of the transmitter or receiver antennas has a dipole moment that is non-coaxial with the longitudinal axis of the tool. The at least one non-coaxial antenna can rotate relative to the other antenna. Energy is transmitted from the transmitter antenna and a signal associated with the transmitted energy is measured at the receiver antenna while the at least one non-coaxial antenna rotates relative to the other antenna.

6 Claims, 4 Drawing Sheets

MEASUREMENT OF FORMATION PARAMETERS USING ROTATING DIRECTIONAL EM ANTENNA

This application claims priority as a divisional application of U.S. patent application Ser. No. 12/136,858, filed Jun. 11, 2008. The disclosure of the priority application is incorporated by reference herein in its entirety.

BACKGROUND

1. Technical Field

This disclosure relates generally to oil and gas well logging, and more specifically to directional resistivity measurements using a transmitter/receiver pair whereby there is relative rotation between the transmitter and receiver antennas. A method is disclosed for mathematically extracting some or all of the nine components of the electromagnetic coupling tensor for a formation and the distances to bed boundaries using the transmitter/receiver pair described herein.

2. Description of the Related Art

An alternative to wireline logging techniques is the collection of data on downhole conditions during the drilling process. By collecting and processing such information during the drilling process, the driller can modify or correct key steps of the operation to optimize performance. Schemes for collecting data of downhole conditions and movement of the drilling assembly during the drilling operation are known as measurement-while-drilling ("MWD"). Similar techniques focusing more on measurement of formation parameters than on movement of the drilling assembly are known as logging-while-drilling ("LWD"). However, the terms MWD and LWD are often used interchangeably, and the use of either term in this disclosure will be understood to include both the collection of formation and borehole information, as well as data on movement and placement of the drilling assembly. The term "parameter", as used herein, includes, but is not limited to, formation properties, dip and azimuth of bed boundaries, distances to bed boundaries, as well as data on movement and placement of the drilling assembly. Formation "properties" include, for example, vertical resisitvity, horizontal resistivity, the conductivity tensor, the dielectric permittivity, porosity, and saturation. MWD tools are available to guide drill strings and therefore the resulting boreholes into more productive reservoir zones. MWD tools used for this purpose typically have been propagation resistivity tools, also known as array compensated resistivity (ARC) tools, with a 360° measurement and deep imaging capability to detect fluid contacts and formation changes up to 15 feet from the borehole. Measurements are commonly made of the phase-shift and attenuation of the signals at the receiver coils, which are indicative of the rock conductivity.

Currently available ARC tools are non-azimuthal and utilize two receivers that compensate for any electronic drift associated with the transmitter. The electronic drift associated with the two receivers and any imbalance between the two receivers is removed using a scheme called borehole compensation, which involves the use of a second transmitter, symmetrically placed with respect to the first transmitter. The transmitters are alternately energized so two phase difference signals can be measured when the two transmitter coils operate at identical frequencies. However, alternately using two transmitter coils slows the rate of data acquisition, which can lead to errors due to the time delay between sequential measurements. Further, use of multiple transmitters may require the signals to be time-multiplexed when operating at the same frequency to avoid cross-talk. Multiplexing slows the rate of data acquisition. The errors due to time delays are magnified when drilling rates (rate of penetration) are high.

As an improvement to the ARC tools, tools were developed that incorporate tilted receiver antennas in the drill collar. The non-axial antennae obtain directional electromagnetic measurements that are used to determine distance and azimuthal orientation of formation boundaries in any type of mud. These measurements are transmitted uphole and are displayed on a graphical interface to provide information on distance to boundaries, formation resistivity and orientation. This information is critical in low resistivity pay zones and in laminated formations because accurate identification and characterization of hydrocarbon reserves is not possible without knowing the resistivity anisotropy. Further, using a transmitter/receiver pair in which one of the antennae is tilted or non-axial, a ratio of any two measurements at two different azimuthal angles can be used to remove the electronic drift of both the transmitter and receiver.

However, if the resistivity anisotropy of the formation is to be completely understood, values for all nine components of the electromagnetic coupling tensor need to be obtained. For example, a complex conductivity matrix can be expressed as $$\alpha_{apparent} = \begin{pmatrix} \sigma_{xx} & \sigma_{xy} & \sigma_{xz} \\ \sigma_{yx} & \sigma_{yy} & \sigma_{zx} \\ \sigma_{zx} & \sigma_{zy} & \sigma_{zz} \end{pmatrix}$$

which can be inverted for horizontal resistivity, vertical resistivity, dip angle and azimuth assuming a dipping layered earth model.

Further, methods for extracting all nine components (XX XY, XZ YX, YY, YZ, ZX ZY, ZZ) of the electromagnetic tensor are available for tri-axial wireline tools that are commonly referred to as tri-axial measurements. This method preferably uses three collocated transmitters and three collocated receivers with orientations in the x, y and z directions wherein the z direction is along the tool axis or coaxial with the tool. Measurements with different transmitter/receiver (T/R) combinations that are corrected for antenna magnetic dipoles yield the nine coupling tensor components directly. Obviously, the use of three transmitters and three receivers (i.e., six antennas) presents data acquisition and gain correction problems.

Returning to MWD and LWD tools, Schlumberger's PERISCOPE™ tool uses tilted and axial antennas and the rotation of the tool or drill string to obtain the five non-zero components when in planar or "layer cake" formations using a fitting algorithm performed on harmonic behavior of the measurement with respect to the tool face. A tool having three transmitters with different azimuthal orientations and a tilted receiver can, in combination with tool rotation, obtain all nine components of the electromagnetic coupling tensor.

Therefore, using current technology, determination of all nine couplings (XX XY, XZ, YX, YY, YZ, ZX, ZY, ZZ) of a formation electromagnetic coupling tensor requires a minimum of four antennas (one tilted antenna and three possibly collocated antennas) combined with the tool rotation. The relative gain of each antenna pair needs to be either measured or estimated from the data. Also, the azimuthal angle of all respective antenna combinations must be measured and considered constant, which may detract from the accuracy of the calculations.

Therefore, there is a need for a tool and method that provide for a more simplified extraction of all nine components of the electromagnetic coupling tensor which avoids the use of multiple transmitters and receivers and the inherent disadvantages associated with multiple transmitter/receiver use.

SUMMARY OF THE DISCLOSURE

A logging tool and method to make subsurface measurements is disclosed, wherein the tool is placed within a borehole penetrating a formation. The tool has a transmitter antenna and a receiver antenna spaced apart along a longitudinal axis of the tool, and at least one of the transmitter or receiver antennas has a dipole moment that is non-coaxial with the longitudinal axis of the tool. The at least one non-coaxial antenna can rotate relative to the other antenna. Energy is transmitted from the transmitter antenna and a signal associated with the transmitted energy is measured at the receiver antenna while the at least one non-coaxial antenna rotates relative to the other antenna Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not to scale and that the disclosed embodiments are sometimes illustrated diagrammatically and in partial views. In certain instances, details that are not necessary for an understanding of the disclosed methods and apparatuses or that render other details difficult to perceive may have been omitted. It should be understood, of course, that this disclosure is not limited to the particular embodiments illustrated herein.

DETAILED DESCRIPTION

The tools and methods disclosed herein are applicable to wireline or LWD tools that contain directional antennas to determine all or some of the electromagnetic coupling tensor components of a formation. The components may be used for well placement applications and/or formation evaluation. For example, the components may be passed to an inversion routine to determine the distances to bed boundaries, anisotropic resistivities, dip, and azimuth of the formation. Distances to bed boundaries, for example, may aid in deciding drilling directions.

Figure 1:
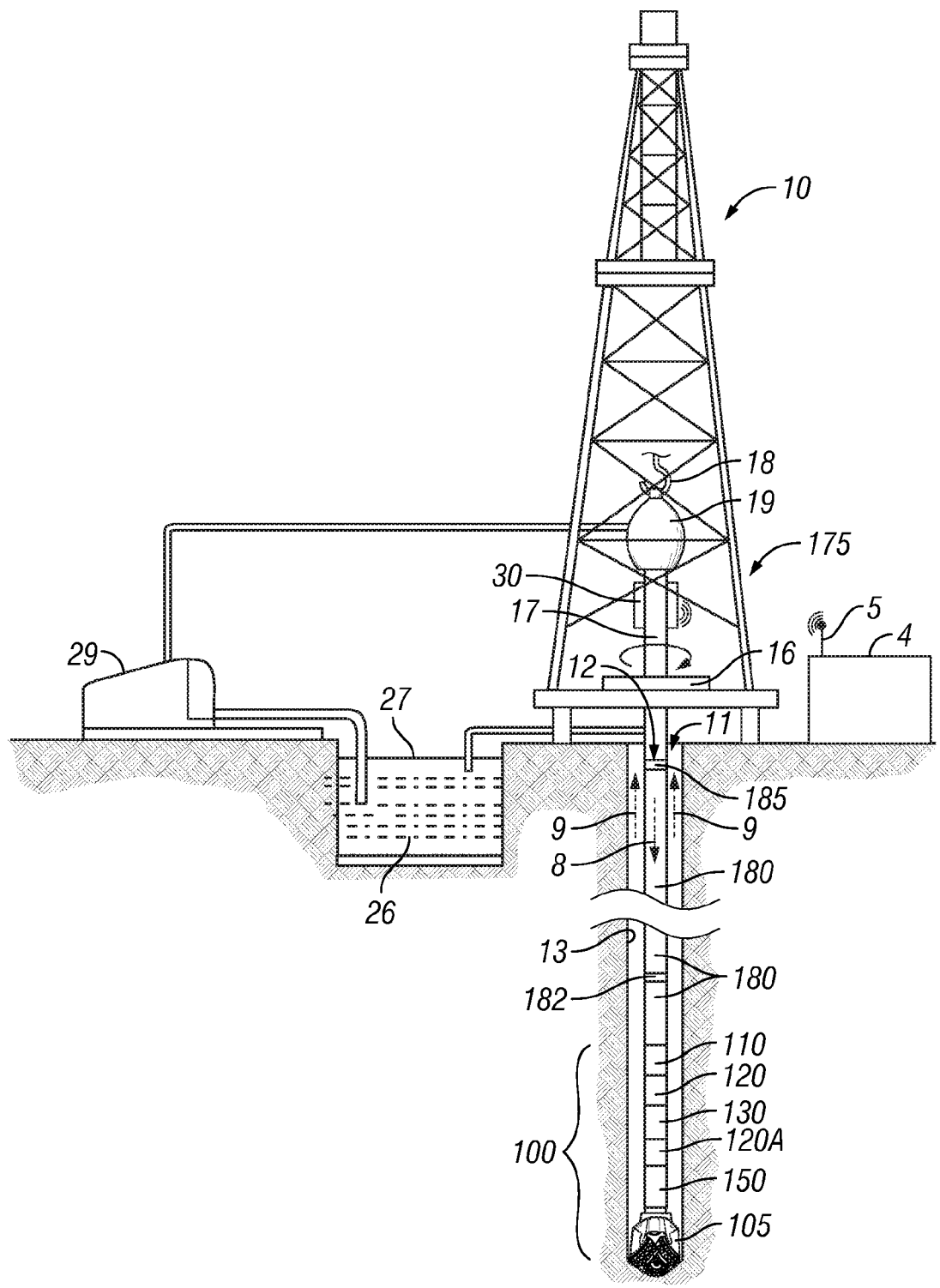
FIG. 1 illustrates, partially in schematic and block form, a wellsite system in which the disclosed tools and methods can be employed.

For background purposes, FIG. 1 illustrates a wellsite system in which the disclosed methods can be employed. The wellsite can be onshore or offshore. In this exemplary system, a borehole 11 is formed in subsurface formations by rotary drilling in a manner that is well known. Directional drilling can also be used.

A drill string 12 is suspended within the borehole 11 and has a bottom hole assembly (BHA) 100 which includes a drill bit 105 at its lower end. The surface system includes platform and derrick assembly 10 positioned over the borehole 11 and the assembly 10 includes a rotary table 16, kelly 17, hook 18 and rotary swivel 19. The drill string 12 is rotated by the rotary table 16, energized by means not shown, which engages the kelly 17 at the upper end of the drill string 12. The drill string 12 is suspended from a hook 18, attached to a traveling block (also not shown), passes through the kelly 17, and the rotary swivel 19 permits rotation of the drill string 12 relative to the hook 18. As is well known, a top drive system could alternatively be used.

The surface system of FIG. 1 further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annulus region between the outside of the drill string 12 and the wall 13 of the borehole 11, as indicated by the directional arrows 9. In this known manner, the drilling fluid 26 lubricates the drill bit 105 and carries formation cuttings up to the surface, or the cuttings are removed from the drilling fluid 26 before it is returned to the pit 27 for recirculation.

The bottom hole assembly 100 includes a logging-while-drilling (LWD) module 120, a measuring-while-drilling (MWD) module 130, a roto-steerable system and motor 150, and drill bit 105. The LWD module 120 is housed in a special type of drill collar, as is known in the art, and can contain one or a plurality of known types of logging tools. It will also be understood that more than one LWD and/or MWD module can be employed, e.g., as represented at 120A. References, throughout, to a module at the position of 120 can alternatively mean a module at the position of 120A as well. The LWD module 120 includes capabilities for measuring, processing, and storing information, as well as for communicating with the surface equipment. The LWD module 120 includes a directional resistivity measuring device, such as one of the Schlumberger PERISCOPE™ directional deep imaging 360° resistivity tools.

The MWD module 130 is also housed in a type of drill collar, as is known in the art, and can contain one or more devices for measuring characteristics of the drill string and drill bit. The MWD tool 130 further includes an apparatus (not shown) for generating electrical power to the downhole system, such as a mud turbine generator powered by the flow of the drilling fluid. Other power and/or battery systems may be employed. The MWD module 130 may include one or more of the following types of measuring devices: a weight-on-bit measuring device, a torque measuring device, a vibration measuring device, a shock measuring device, a stick slip measuring device, a direction measuring device, and an inclination measuring device.

In the system of FIG. 1, a drill string telemetry system is employed which, in the illustrated embodiment, comprises a system of inductively coupled wired drill pipes 180 that extend from a surface sub 185 to an interface sub 110 in the bottom hole assembly 100. Depending on factors including the length of the drill string, relay subs or repeaters can be provided at intervals in the string of wired drill pipes, an example being shown at 182. The interface sub 110 provides an interface between the communications circuitry of the LWD and MWD modules 120, 130 and the drill string telemetry system which, in this embodiment, comprises wired drill pipes with inductive couplers 180. The wired drill pipes 180 can be coupled with an electronics subsystem 30 that rotates with kelly 17 and includes a transceiver and antenna that communicate bidirectionally with the antenna and transceiver of logging and control unit 4, which includes the uphole processor subsystem. In FIG. 1, a communication link 175 is schematically depicted between the electronics subsystem 30 and antenna 5 of the logging and control unit 4. Accordingly, the configuration of FIG. 1 provides a communication link from the logging and control unit 4 through communication link 175, to surface sub 185, through the wired drill pipe telemetry system, to downhole interface 110 and the other components of the bottom hole assembly 100 and, also, the reverse thereof, for bidirectional operation.

While only one logging and control unit 4 at one wellsite is shown, one or more surface units across one or more wellsites may be provided. The surface units may be linked to one or more surface interfaces using a wired or wireless connection via one or more communication lines. The communication topology between the surface interface and the surface system can be point-to-point, point-to-multipoint or multipoint-to-point. The wired connection includes the use of any type of cables or wires using any type of protocols (serial, Ethernet, etc.) and optical fibers. The wireless technology can be any kind of standard wireless communication technology, such as IEEE 802.11 specification, Bluetooth, zigbee or any non-standard RF or optical communication technology using any kind of modulation scheme, such as FM, AM, PM, FSK, QAM, DMT, OFDM, etc. in combination with any kind of data multiplexing technologies such as TDMA, FDMA, CDMA, etc.

Figure 2:
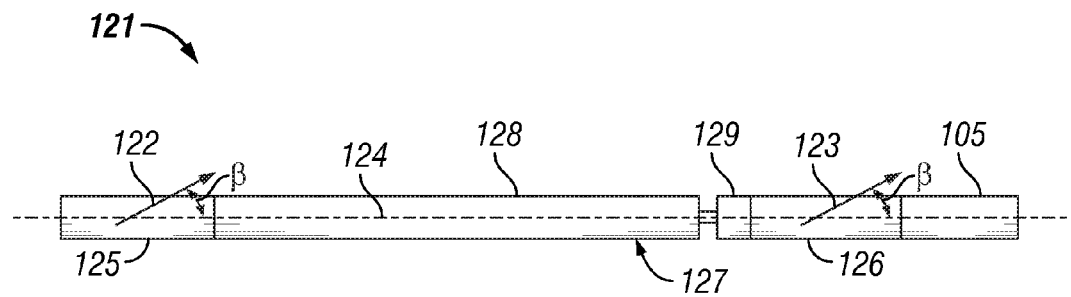
FIG. 2 is a partial schematic view of a deep imaging resistivity tool and motor which can be used to practice the disclosed methods and techniques.

FIG. 2 is a simplified schematic view of a directional deep-reading logging-while-drilling tool 121, as part of the LWD tool or tools 120 shown in FIG. 1. The tool 121 includes at least two antennas 122, 123 that, in the example shown in FIG. 2, are tilted with respect to the tool axis 124. The arrows shown as figure elements 122 and 123 in FIGS. 2, 3, and 4A-4F represent the electric or magnetic dipole moments of the antennas. As shown in FIGS. 4A-4F below, the antennas 122, 123 may be tilted, transverse, or coaxial with the tool axis 124. Returning to FIG. 2, the antennas 122, 123 in this example are tilted at an angle β with respect to the axis 124. The significance of the angle β will be discussed in greater detail below in connection with FIG. 3. Still referring to FIG. 2, the tool 121 includes a receiver sub 125 and a transmitter sub 126 with a mud motor or other motor apparatus 127 disposed between the receiver and transmitter subs 125, 126. In the embodiment shown in FIG. 2, the motor 127 includes a stator section 128 and a rotor section 129. Accordingly, the rotor section 129 causes the transmitter 123 to rotate with respect to the receiver 122. Of course, the transmitter and receiver functions are interchangeable and, while the tool 121 shown in FIG. 2 includes a rotating transmitter antenna 123, the antenna 123 could serve as a receiver antenna and the antenna 122 could serve as a transmitter. Preferably, the motor 127 is a mud motor or other positive displacement motor (PDM). The drill bit is shown schematically at 105 close to tool 121, but the tool 121 can be placed higher or farther above the drill bit 105 in the BHA 100 than what is illustrated schematically in FIG. 2. Also, an antenna could be carried by drill bit 105. Further, a transmitter antenna may broadcast at various frequencies.

Figure 3:
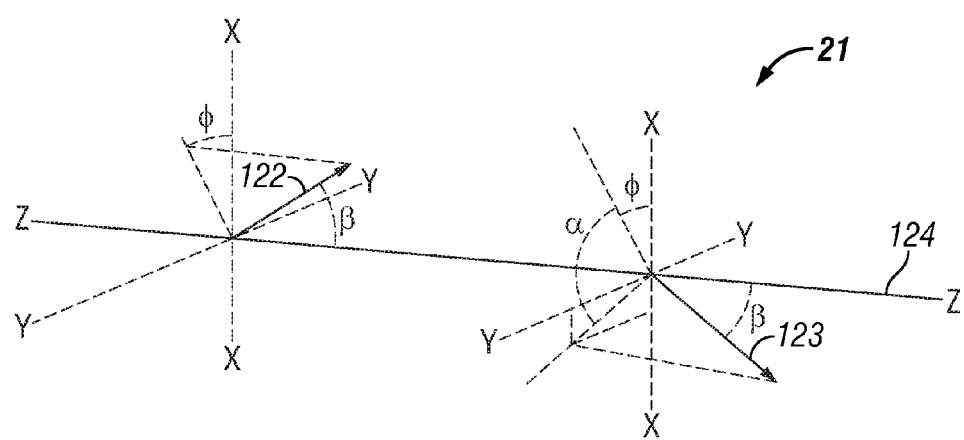
FIG. 3 diagrammatically illustrates a two antenna apparatus wherein both the receiver antenna, shown at the left, and the transmitter antenna, shown at the right, are tilted at an angle $\beta$ with respect to the tool axis z, the receiver is rotating at an angle $\phi$ with respect to the vertical axis x and $\alpha$ is the azimuthal angle difference between the receiver and transmitter antennas.

Turning to FIG. 3, the receiver antenna 122 is shown rotated by an angle φ relative to the x-axis of a non-rotating coordinate system that is referenced to a tool-fixed coordinate system in which the z axes of both systems are aligned. φ may be fixed or variable. The angle β is the angle between the dipole moment of the antenna and the z axis 124. The transmitter antenna 123 is shown rotated at an angle φ plus α with respect to the non-rotating x-axis. In coordinates used herein, the z-axis corresponds to the tool axis 124. Measurements at the receiver 122 include (1) the orientation angle or the tool face angle φ of receiver 122 with respect to the non-rotating x-axis; (2) the azimuthal angle difference a between the antennas 122, 123; and (3) the signal or voltage $V_R$ received at the antenna 122. The angles φ and α are independent of each other and a gives the relative rotation between the transmitter and receiver. The antenna configurations may be for a propagation or induction resistivity tool.

Still referring to FIG. 3, when BHA 100 is undergoing rotation, the voltage $V_R$ can be expressed as a product of matrices as shown below in which the transmitter 123 and receiver 122 are tilted at an angle β with respect to the tool axis 124. The receiver antenna 122 is rotated with respect to the non-rotating x axis by an angle φ, and the relative rotation angle is given by α. For the tool 121 shown in FIGS. 2 and 3, the voltage $V_R$ can be expressed as shown in Equation 1a for any tilt angle β.

$$V_R = (\cos\alpha \cdot \sin\beta, \sin\alpha \cdot \sin\beta, \cos\beta) \cdot \begin{bmatrix} \cos\phi & \sin\phi & 0 \\ -\sin\phi & \cos\phi & 0 \\ 0 & 0 & 1 \end{bmatrix} \cdot \begin{bmatrix} XX & XY & XZ \\ YX & YY & YZ \\ ZX & ZY & ZZ \end{bmatrix} \cdot \begin{bmatrix} \cos\phi & -\sin\phi & 0 \\ \sin\phi & \cos\phi & 0 \\ 0 & 0 & 1 \end{bmatrix} \cdot \begin{pmatrix} \sin\beta \\ 0 \\ \cos\beta \end{pmatrix} \quad (1a)$$

If β=45° Equation 1a reduces to that shown as Equation 1b.

$$V_R = \frac{1}{2}(\cos\alpha, \sin\alpha, 1) \cdot \begin{bmatrix} \cos\phi & \sin\phi & 0 \\ -\sin\phi & \cos\phi & 0 \\ 0 & 0 & 1 \end{bmatrix} \cdot \begin{bmatrix} XX & XY & XZ \\ YX & YY & YZ \\ ZX & ZY & ZZ \end{bmatrix} \cdot \begin{bmatrix} \cos\phi & -\sin\phi & 0 \\ \sin\phi & \cos\phi & 0 \\ 0 & 0 & 1 \end{bmatrix} \cdot \begin{pmatrix} 1 \\ 0 \\ 1 \end{pmatrix} \quad (1b)$$

The following Equations 2a and 2b can be obtained for the received signal or voltage $V_R$ from Equations 1a and 1b) (β=45° respectively:

$$V_R = \cos^2\beta \cdot ZZ + \sin^2\beta \cdot \left[\frac{XX+YY}{2} \cdot \cos\alpha - \frac{XY-YX}{2} \cdot \sin\alpha\right] + \cos\beta \cdot \sin\beta \cdot [ZX \cdot \cos\phi + ZY \cdot \sin\phi + XZ \cdot \cos(\alpha+\phi) + YZ \cdot \sin(\alpha+\phi)] + \sin^2\beta \cdot \left[\frac{XX-YY}{2} \cdot \cos(\alpha+2\phi) + \frac{XY+YX}{2} \cdot \sin(\alpha+2\phi)\right] \quad (2a)$$

$$V_R = \frac{1}{2}\Big[ZZ + \frac{(XX+YY)}{2}\cdot\cos\alpha - \frac{(XY-YX)}{2}\cdot\sin\alpha + \quad (2b)$$
$$ZX\cdot\cos\phi + ZY\cdot\sin\phi + XZ\cdot\cos(\alpha+\phi) + YZ\cdot\sin(\alpha+\phi) +$$
$$\frac{(XX-YY)}{2}\cdot\cos(\alpha+2\phi) + \frac{(XY+YX)}{2}\cdot\sin(\alpha+2\phi)\Big]$$

Equation 2a for $V_R$ can be re-written as a sum of the nine terms 3a-3i shown below:

$$\cos^2\beta\cdot ZZ \quad (3a)$$

$$\sin^2\beta\cdot\frac{XX+YY}{2}\cdot\cos\alpha \quad (3b)$$

$$-\sin^2\beta\cdot\frac{XY-YX}{2}\cdot\sin\alpha \quad (3c)$$

$$\cos\beta\cdot\sin\beta\cdot ZX\cdot\cos\phi \quad (3d)$$

$$\cos\beta\cdot\sin\beta\cdot ZY\cdot\sin\phi \quad (3e)$$

$$\cos\beta\cdot\sin\beta\cdot XZ\cdot\cos(\alpha+\phi) \quad (3f)$$

$$\cos\beta\cdot\sin\beta\cdot YZ\cdot\sin(\alpha+\phi) \quad (3g)$$

$$\sin^2\beta\cdot\frac{XX-YY}{2}\cdot\cos(\alpha+2\phi) \quad (3h)$$

$$\sin^2\beta\cdot\frac{XY+YX}{2}\cdot\sin(\alpha+2\phi) \quad (3i)$$

Equation 2b ($\beta=45°$) for $V_R$ can also be re-written as the sum of the nine terms 4a-4i shown below (each term needing to be scaled by ½):

$$ZZ \quad (4a)$$

$$\frac{(XX+YY)}{2}\cdot\cos\alpha \quad (4b)$$

$$-\frac{(XY-YX)}{2}\cdot\sin\alpha \quad (4c)$$

$$ZX\cdot\cos\phi \quad (4d)$$

$$ZY\cdot\sin\phi \quad (4e)$$

$$XZ\cdot\cos(\alpha+\phi) \quad (4f)$$

$$YZ\cdot\sin(\alpha+\phi) \quad (4g)$$

$$\frac{(XX-YY)}{2}\cdot\cos(\alpha+2\phi) \quad (4h)$$

$$\frac{(XY+YX)}{2}\cdot\sin(\alpha+2\phi) \quad (4i)$$

The variables in those terms are the trigonometric functions involving $\phi$ and $\alpha$. Using measurements made by the tool 121 and a fitting algorithm, $V_R$ can be fitted to an expression involving those trigonometric terms, thus providing various fitting coefficients. The measurements are taken for various (at least nine) values for $\phi$ and $\alpha$. The nine terms 3a-3i or 4a-4i then relate the components of the electromagnetic coupling tensor to the fitting coefficients, either directly or as some combination of the coupling components.

Figure 5:
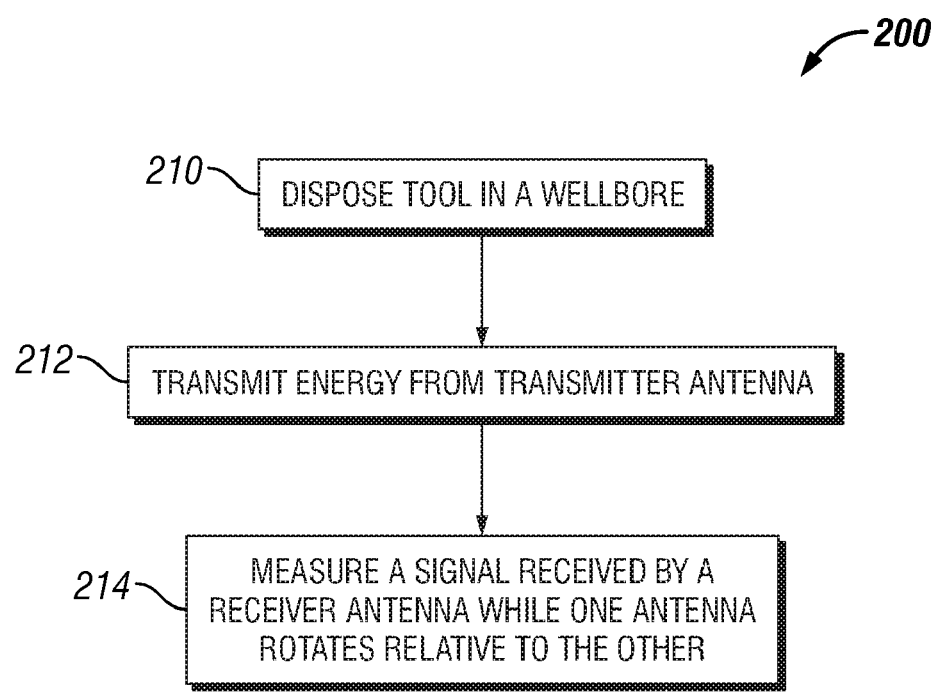
FIG. 5 is a flow chart showing one embodiment of the method, in accordance with the present invention.

FIG. 5 shows an embodiment 200 of the present method as a flow chart. In step 210, a tool is disposed in a wellbore. Step 212 is to transmit energy from a transmitter antenna, and step 214 is to measure a signal received by a receiver antenna while one antenna rotates relative to the other.

Figure 4A:
FIGS. 4A-4G illustrate different receiver/transmitter pairs wherein the antennas disposed to the right in FIGS. 4A-4G rotate with respect to the antennas disposed to the left.
Figure 4B:
Figure 4C:
Figure 4D:
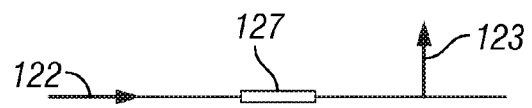
Figure 4E:
Figure 4F:
Figure 4G:
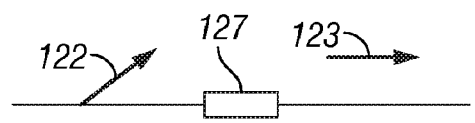

The disclosed method and apparatus also yield all nine components of the coupling tensor when the antennas 122, 123 are tilted at different angles, as illustrated in FIG. 4A. However, if the antennas 122, 123 are configured such that at least one antenna is axial or transverse (FIGS. 4B-4F), while useful information may be had, not all nine components can be determined. For example, if the antennas 122, 123 are transverse, as illustrated in FIG. 4B, the coupling components that can be determined are limited to XX, XY, YX, and YY. This can been seen by substituting $\beta=90°$ into Equation 1a. The embodiment of FIG. 4G, because of the radial offset of transmitter antenna 123, does yield all nine components, though Equation 1a would have to be slightly modified to account for the offset. In U.S. Patent No. 6,509,738 by Minerbo et al, the use of offset parallel antennas is described.

The derivation above assumes rotation of the BHA 100 and a relative rotation between an upper portion of BHA 100 and a lower portion of BHA 100. The rotation angle of the upper portion of BHA 100 is $\phi$, and the relative rotation angle of the lower portion of BHA 100 is given by the angle $\alpha$. However, certain drilling operations, such as directional drilling, have drilling modes in which the upper portion of BHA 100 substantially does not rotate ("sliding mode"). The lower portion of BHA 100, however, rotates whenever drilling is in progress (e.g., when drilling fluid is pumped and drives the mud motor). Thus, there is generally a relative rotation; that is, $\alpha$ is not constant, though $\phi$ might be.

Applying those constraints (i.e., fixed $\phi$) in terms 3a-3i or 4a-4i leads to the conclusion that certain coupling components cannot be separated without further measurements. Specifically, because terms 3a, 3d, and 3e (or 4a, 4d, and 4e) have no $\alpha$ dependence, they will be lumped together by the fitting algorithm as a sum that is equal to a constant. That sum contains three unknown coupling components, but is a single equation. Thus, three independent measurements must be obtained to resolve the three unknown components.

One way in which this can be accomplished is by making measurements with three distinct $\phi$ values. That is, the upper portion of BHA 100 must be rotated to three different orientations, and measurements as a function of $\alpha$ must be made at each of the "fixed" orientations, Alternatively, additional receiver antennas may be added to provide sufficient independent measurements. For example, three orthogonal receiver antennas may be used.

In addition, certain assumptions may reduce the number of couplings that need to be resolved. For example, a 1D formation model ("layer cake") leaves only five coupling components since proper rotational manipulation of the coordinate systems zeros out the off-diagonal components having a Y coupling. A general 3D formation model, however, would require three receiver antennas to resolve all nine components while in sliding mode. While specific embodiments have been described in terms of certain transmitters and receivers, it is well known in the art, by the theory of reciprocity, that the roles of receivers and transmitters may be interchanged. Also, while the described embodiments have a rotating transmitter portion and a sometimes rotating, sometimes sliding receiver portion, the receiver antennas could be on the rotating portion and the transmitters on the sometimes rotating, sometimes sliding portion. For example, for the 3D formation model example above, if a receiver were on the rotating portion, three transmitters on the sometimes rotating, sometimes sliding portion would suffice.

In a wireline embodiment, one of the antennas 123 or 122 is rotated relative to the other while the measurements are made. The relative rotation may be effected either physically or the broadcast signal can be steered, for example, by phasing. If the actual antenna rotation is not feasible, then a virtual rotation can be mathematically created by linear combinations of the other measurements. U.S. Pat. Nos. 6,181,138 and 6,794,875 both describe how to generate the response of a virtual receiver with arbitrary angle relative to the tool axis. Note that for such applications more than one transmitter 123/receiver 122 pair will be needed.

While only certain embodiments have been set forth, alternatives and modifications will be apparent from the above description to those skilled in the art. These and other alternatives are considered equivalents and within the scope of this disclosure and the appended claims.

The invention claimed is:

1. A downhole tool, comprising:
a transmitter sub having a transmitter antenna and a receiver sub having a receiver antenna spaced apart along a longitudinal axis of the tool, wherein at least one of the transmitter or receiver antennas has a dipole moment that is non-coaxial with the longitudinal axis, and in which the at least one non-coaxial antenna can rotate relative to the other antenna.

2. The downhole tool of claim 1, wherein the at least one non-coaxial antenna that is rotatable relative to the other antenna has a dipole moment that is tilted or transverse with respect to the longitudinal axis.

3. The downhole tool of claim 1, wherein one of the antennas is close to or carried by a drill bit.

4. The downhole tool of claim 1, wherein the transmitter antenna broadcasts at various frequencies.

5. The downhole tool of claim 1, wherein the transmitter antenna and the receiver antenna are both non-coaxial with the longitudinal axis.

6. The downhole tool of claim 1, wherein the tool is either a wireline tool or a while-drilling tool.

* * * * *